(12) United States Patent
Frantz et al.

(10) Patent No.: US 7,553,388 B2
(45) Date of Patent: Jun. 30, 2009

(54) CONSOLIDATION JOINING OF THERMOPLASTIC LAMINATE DUCTS

(75) Inventors: Walter Forrest Frantz, North Bend, WA (US); Matthew K. Lum, Mercer Island, WA (US); Mark L. Younie, Mill Creek, WA (US)

(73) Assignee: The Boeing Company, Seattle, WA (US)

( * ) Notice: Subject to any disclaimer, the term of this patent is extended or adjusted under 35 U.S.C. 154(b) by 540 days.

(21) Appl. No.: 11/466,585

(22) Filed: Aug. 23, 2006

(65) Prior Publication Data

US 2007/0107832 A1  May 17, 2007

Related U.S. Application Data

(62) Division of application No. 10/215,833, filed on Aug. 9, 2002, now Pat. No. 7,112,054.

(51) Int. Cl.
*B29C 53/42* (2006.01)
*B29C 53/46* (2006.01)
(52) U.S. Cl. .................. 156/218; 100/232; 493/269
(58) Field of Classification Search .......... None
See application file for complete search history.

(56) References Cited

U.S. PATENT DOCUMENTS

| | | | |
|---|---|---|---|
| 1,064,741 A | | 6/1913 | Jones |
| 3,044,729 A | * | 7/1962 | Prellwitz .................... 72/20.3 |
| 3,388,017 A | | 6/1968 | Grimsley et al. |
| 3,499,072 A | | 3/1970 | Helling et al. |
| 3,798,302 A | | 3/1974 | Kostner et al. |
| 3,862,736 A | | 1/1975 | Herro |
| 3,899,277 A | * | 8/1975 | Winter .................... 425/383 |
| 3,899,913 A | * | 8/1975 | Schlosser et al. ............ 72/383 |

(Continued)

FOREIGN PATENT DOCUMENTS

DE  861 316 C  12/1952

(Continued)

OTHER PUBLICATIONS

CETEX® Application in Ducting; Ten Cate Advanced Composites Technical Document Nr ITD5235.017; Oct. 1990; pp. 1-10; Nijverdal, The Netherlands.

(Continued)

*Primary Examiner*—Richard Crispino
*Assistant Examiner*—Barbara J. Musser
(74) *Attorney, Agent, or Firm*—Alston & Bird LLP (57) ABSTRACT

There is provided an apparatus and method for consolidation joining a thermoplastic preform to form a duct. The apparatus includes first and second longitudinally extending support structures. The first support structure at least partially defines a cavity for supporting the preform in a desired configuration of the duct. The second support structure extends in the cavity such that the preform can be supported between the first and second support structures. The second support structures can include an elastomeric device that is configured to adjust radially and urge the interface of the preform against the first support structure. A heater is configured to heat an interface of the preform to above a glass transition temperature. The resulting duct is has a longitudinal consolidation joint and defines a passage.

17 Claims, 8 Drawing Sheets

U.S. PATENT DOCUMENTS

| | | |
|---|---|---|
| 3,952,676 A | 4/1976 | Rockefeller |
| 4,005,234 A | 1/1977 | Stroupe |
| 4,068,622 A | 1/1978 | Vola |
| 4,161,383 A | 7/1979 | Gadani |
| 4,469,542 A | 9/1984 | Reil |
| 4,559,765 A | 12/1985 | Cress et al. |
| 4,822,272 A | 4/1989 | Yanase et al. |
| 5,225,016 A | 7/1993 | Sarh |
| 5,266,137 A | 11/1993 | Hollingsworth |
| 5,310,443 A | 5/1994 | Burger |
| 5,409,559 A | 4/1995 | Lajovic |
| 5,505,813 A * | 4/1996 | Scheifele et al. ......... 156/380.1 |
| 5,589,019 A | 12/1996 | Van Beersel et al. |
| 5,635,014 A | 6/1997 | Taylor |
| 5,714,738 A | 2/1998 | Hauschulz et al. |
| 5,738,815 A | 4/1998 | Laskey et al. |
| 5,916,403 A | 6/1999 | Cushner et al. |
| 6,089,851 A | 7/2000 | Lupke et al. |
| 6,284,089 B1 | 9/2001 | Anderson et al. |
| 6,596,121 B1 | 7/2003 | Reynolds, Jr. |

FOREIGN PATENT DOCUMENTS

| | | |
|---|---|---|
| EP | 0 141 604 | 5/1985 |
| GB | 1 225 077 | 3/1971 |
| JP | 59 078826 A | 8/1984 |
| JP | H10-16068 | 1/1998 |

OTHER PUBLICATIONS

A short note on Duct Manufacturing for Aircraft Environmental Control Systems using CETEX Continuous fiber reinforced thermoplastic; Ten Cate Advanced Composites Technical Document NR ITD5241.002; 1992; pp. 1-6; Nijverdal, The Netherlands.

I.Y. Chang, J.K. Lees, Recent Development in Thermoplastic Composites: A Review of Matrix Systems and Processing Methods, *Journal of Thermoplastic Composite Materials*, 1988, pp. 277-296.

Patrick Bense, *Making Profiles from Composites by Pultrusion*, pp. 1-21.

* cited by examiner

CONSOLIDATION JOINING OF THERMOPLASTIC LAMINATE DUCTS

CROSS REFERENCE TO RELATED APPLICATIONS

This application is a divisional of U.S. patent application Ser. No. 10/215,833, filed Aug. 9, 2002, now U.S. Pat. No. 7,112,054 which is hereby incorporated herein in its entirety by reference.

BACKGROUND OF THE INVENTION

1) Field of the Invention

The present invention relates to apparatuses and methods for forming ducts and, more specifically, thermoplastic ducts formed by consolidation joining.

2) Description of Related Art

Ducts provide transport passageways for a wide variety of applications. For example, tubular ducts are widely used for air flow in aircraft environmental control systems. Similarly, ducts provide passageways for transporting gases for heating and ventilation in other vehicles and in buildings. Water distribution systems, hydraulic systems, and other fluid networks also often use ducts for fluid transport. In addition, solid materials, for example, in particulate form can be delivered through ducts. Ducts for the foregoing and other applications can be formed of metals, plastics, ceramics, composites, and other materials.

One conventional aircraft environmental control system utilizes a network of ducts to provide air for heating, cooling, ventilation, filtering, humidity control, and/or pressure control of the cabin. In this conventional system, the ducts are formed of a composite material that includes a thermoset matrix that impregnates, and is reinforced by, a reinforcing material such as Kevlar®, registered trademark of E.I. du Pont de Nemours and Company. The thermoset matrix is typically formed of an epoxy or polyester resin, which hardens when it is subjected to heat and pressure. Ducts formed of this composite material are generally strong and lightweight, as required in many aircraft applications. However, the manufacturing process can be complicated, lengthy, and expensive, especially for specially shaped ducts such as curved ducts and ducts that include a spud or attached fitting, a bead, a bell or flared portion, a conical section, or another contour. For example, curved ducts are conventionally formed around a disposable plaster mandrel. The plaster mandrel is formed in a specially shaped rotatable tool that acts as a mold to form the plaster mandrel according to the desired shape of the duct. First, a cavity of the tool is partially filled with uncured plaster, and the tool is rotated so that the plaster coats an inner surface of the tool cavity. When the plaster is partially cured to form the mandrel, the tool is stopped and opened so that the plaster mandrel can be removed and placed in an oven for subsequent curing. The mandrel is then treated with a sealant, cured again, and treated with a release agent. Plies of fabric, such as Kevlar®, preimpregnated with the thermoset material are cut and draped over the mandrel, often by hand, and a heat gun is used to mold the plies to the shape of mandrel. The mandrel is placed in a vacuum bag, which is fitted with one or more valves, and air is evacuated from the bag through the valves so that the bag urges the plies against the mandrel and consolidates the plies while heat is applied to cure the plies and form the duct. When the plies are cured, the vacuum bag is removed and the plaster mandrel is broken and removed from the duct. The duct is cleaned and trimmed to the desired dimensional characteristics. One or more jigs that correspond to the desired shape of the duct are often used for trimming the duct and for accurately locating additional features on the duct such as holes, spuds, brackets, and the like. Further processing is sometimes necessary for adding a bead or bell so that one or both ends of the duct can be secured and sealed to another duct. Typically, a bead is formed by adding additional material, thus adding weight to the duct. Insulation can also be added to the inside and/or outside of the duct.

The manufacturing process for such reinforced thermoset ducts is complicated, time consuming, and expensive. The rotatable tool used to mold the plaster mandrel is specially sized and shaped for creating a duct of specific dimensions, so numerous such tools must be produced and maintained for manufacturing different ducts. The plaster mandrel is formed and destroyed during the manufacture of one duct, requiring time for curing and resulting in plaster that typically must be removed or destroyed as waste. Additionally, the preimpregnated plies change shape while being cured and consolidated and therefore typically must be trimmed after curing to achieve the desired dimensions. The jigs required for trimming and for locating the proper positions for features such as holes and spuds are also typically used for only a duct of particular dimensions, so numerous jigs are required if different ducts are to be formed. Like the rotatable tools used for forming the mandrels, the jigs require time and expense for manufacture, storage, and maintenance.

Additionally, ducts formed of common thermoset epoxies do not perform well in certain flammability, smoke, and toxicity tests, and the use of such materials can be unacceptable if performance requirements are strict. For example, changes in environmental laws or proposed changes to performance requirements mandated by the Federal Aviation Administration would prevent the use of ducts formed from some thermoset composites in certain aircraft environmental control system applications.

One proposed alternative to thermoset composite materials is thermoplastic composites. Thermoplastic composites become plastically deformable when heated above a glass transition temperature. Instead of laying plies of uncured composite material on a mandrel, a sheet of thermoplastic composite material can be manufactured and then heated and formed to a desired shape. Thus, a part can be formed from a thermoplastic composite without using a disposable plaster mandrel and a special tool for forming the mandrel.

The formation of certain shapes of parts, such as ducts, from thermoplastic composite materials requires the formation of joints. Methods for joining members formed from thermoplastic composites are known in the art, but none of the known methods are ideal. Generally, each method of joining thermoplastic composite members includes heating the members to a temperature above the glass transition temperature and holding the members together. One method of providing heat to the members is by generating friction between the members, for example, by reciprocating, ultrasonically vibrating, or friction stirring the members. Undesirably, composites that contain fiber reinforcements, especially long or continuous fibers, can be damaged by these frictional heating methods. Locating tools and backing members for supporting the members are often required, and large members can be difficult to reciprocate. Additionally, ultrasonic methods typically require surface preparations, and friction stirring is typically slow.

Alternatively, heat can be applied by conduction or convection, for example, by hot plate joining, hot gas joining, extrusion joining, or resistance joining. In hot plate joining, a plate is heated and inserted at an interface of the members. The plate is then removed and the members are pressed together. Hot plate joining generally requires simple tooling but is time consuming and is not practical for use with complex shapes. Further, the hot plate can introduce contamination into the interface of the members or oxidize the composite materials, thereby weakening the joint. Hot gas joining is similar to conventional metal welding. An operator inserts a filler rod, typically formed of the composite material, into the interface and directs a stream of hot gas to heat the members and the rod. The gas plasticizes the members and the rod, which provides additional material into the interface. Similarly, extrusion joining is performed by heating the filler rod in an extruder and extruding the heated rod material into the interface while using the hot gas to heat the members. Hot gas and extrusion joining are typically slow, and the quality of the resulting joint can vary significantly depending on the skill of the operator. In resistance joining, an electrically conductive heating element is inserted into the interface. The members are pressed together, and the heating element is electrically energized, causing resistive heating therein, which heats the members. The heating element, which remains in the joint, increases the cost of the joining method and affects the characteristics of the joint, for example, making the joint stiffer than the other portions of the members. Typically, the heating element has a different coefficient of thermal expansion than the thermoplastic material, resulting in stresses in the joint when heated or cooled.

Finally, heat can be provided to the interface by electromagnetism, for example, by electromagnetic joining, microwave joining, laser joining, and infrared joining. Electromagnetic joining is accomplished by dispersing a metallic powder in a bonding material in the interface of the members to be joined. A magnet is moved proximate to the interface, thereby generating heat in the powder. The powder adds to the cost of the joint, and the method is generally limited to joining members of limited thickness. Where a first member has a low absorption and a second member has a high absorption, laser joining can be used by directing a laser beam through the first member so that it is absorbed at the interface by the second member. Laser joining is generally not applicable where the members do not have dissimilar absorptions. In microwave joining, a material susceptible to microwaves is placed in the interface, and the interface is irradiated with microwaves. The method is typically used only if the members are not significantly absorptive of microwaves. Infrared joining, i.e., using an infrared lamp to heat the interface and then pressing the members together, requires a complicated set up and can be time consuming, depending on the absorption characteristics of the members.

Thus, there exists a need for an improved apparatus and method of forming ducts that is effective and cost efficient. Preferably, the method should not require that individual plies be laid on a plaster mandrel. The method should be compatible with plastic and composite materials that provide high strength-to-weight ratios and meet strict flammability, smoke, and toxicity standards. Further, the method should provide a method of forming strong joints and should be adaptable for automated operation to achieve consistent results.

SUMMARY OF THE INVENTION

The present invention provides an apparatus and method for forming thermoplastic ducts with consolidation joints. The ducts can be formed of preforms, which can be thermoplastic laminate sheets preformed to a bent configuration. The thermoplastic material is lightweight, strong, and performs well in flammability, smoke, and toxicity tests. Further, the disposable plaster mandrels for supporting plies are not required, nor are duct-specific rotatable tools for forming such mandrels. Additionally, consolidation joints achieved by the apparatus and method can be strong, and the method is adaptable for automated operation.

In one embodiment, the present invention provides an apparatus for consolidation joining a thermoplastic preform to form a duct having a longitudinal consolidation joint and defining a passage. The apparatus includes first and second longitudinally extending support structures. The first support structure at least partially defines a cavity capable of supporting the preform in a preformed configuration that corresponds to a desired configuration of the duct. The second support structure extends in the cavity defined by the first support structure such that the preform can be supported between the first and second support structures. At least one of the support structures can be adjusted radially so as to urge the preform against the other support structure. The apparatus also includes a heater assembly that is configured to heat an interface of the preform to above a glass transition temperature. At least one of the support structures or the heater assembly can be elastomeric so as to conform to the interface of the preform and provide even pressure along the seam.

According to one aspect of the invention, the second support structure includes a rigid elongate member with an outer surface that corresponds to the desired configuration of the duct. The first support structure is adapted to adjust toward the second support structure from a first position to a second position and thereby configure the preform to the desired configuration of the duct. The first support structure can include a plurality of rods that extend longitudinally and are adjustable radially relative to the second support structure so that the rods can be adjusted radially inward toward the elongate member to configure the preform to the desired configuration. Actuators can be included for adjusting the rods.

According to another aspect, the second support structure includes an inflatable bladder connected to the rigid member. The bladder is configured to receive a fluid for inflating and expanding radially outward toward the first support structure to urge the preform against the first support structure. An anvil corresponding to the desired shape of the duct can be positioned to oppose the bladder so that the bladder can urge the preform against the anvil. The heater assembly can include a heater positioned outside the cavity and in thermal communication with an outer surface of the preform, and/or a flexible heater disposed on the bladder so that the flexible heater can be urged against an interface of the preform. At least one longitudinally extending cooling manifold can be positioned proximate to the preform to receive a cooling fluid for cooling the preform.

According to yet another aspect of the present invention, the second support structure includes the elastomeric device, which is configured to receive a fluid for inflation. The elastomeric device can be inflated to fill the cavity and exert a radially outward pressure, for example, of at least about 20 psi on the preform. The first support structure can include a hollow tube that extends from a first end to a second end and defines a cylindrical cavity therein. The tube can define a slit that extends longitudinally between the ends so that the tube can be adjusted between a closed position and an open position, and the diameter of the tube is reduced by closing the tube.

The present invention also provides a method of forming a thermoplastic laminate duct. The thermoplastic laminate preform can initially be formed by impregnating a reinforcement material such as an aramid, carbon, or glass with a thermoplastic such as polyetherimide or polyphenol sulfide. The method then includes configuring a thermoplastic laminate preform generally to a desired shape of the duct that extends longitudinally and defines a passage. The preform can be configured by actuating a support structure, such as a plurality of longitudinally extending rods, radially inward to bend the preform about a longitudinal axis, for example, about a longitudinal member. A first longitudinal edge of the preform at least partially overlaps a second longitudinal edge of the preform to define an interface between first and second surfaces of the preform. The first and second surfaces of the interface are urged together, for example, by filling a bladder with fluid. The bladder can fill a cavity of the perform and urge the preform radially against an outer support structure. Alternatively, the bladder can be positioned between a beam extending longitudinally through the passage of the preform and the preform so that the bladder urges the preform radially outward and against an outer support structure. The interface is heated while urged together so that the interface is consolidated to foam a joint. For example, at least one resistive heater can be electrically energized to generate thermal energy, which is conducted as heat to the preform. Heaters can be positioned in the passage of the preform and/or outside the preform. Preferably, the interface is heated to above a glass transition temperature of the preform. Subsequent to the heating, the joint can be cooled to a temperature below the glass transition temperature of the preform while continuing to urge the first and second surfaces of the interface together. For example, fluid can be circulated through a manifold in thermal communication with the interface of the preform.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
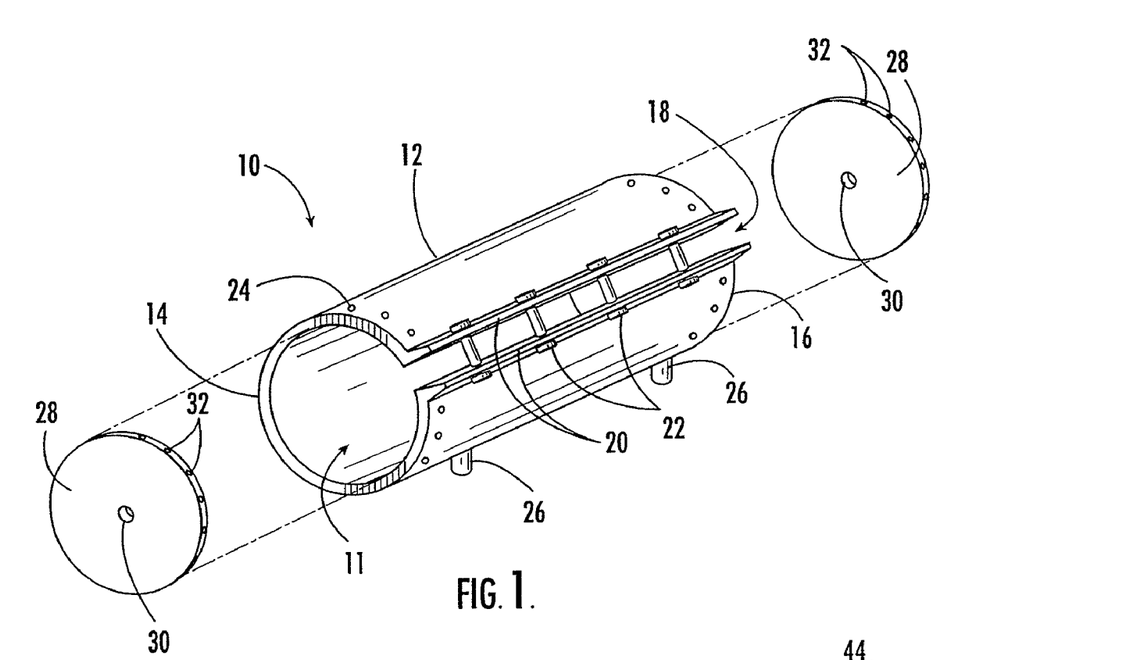
FIG. 1 is a perspective view of a partially assembled consolidation joiner apparatus according to one embodiment of the present invention.

Referring now to FIG. 1, there is shown a consolidation joiner 10 for forming consolidation joints in thermoplastic members according to one embodiment of the present invention. The consolidation joiner 10 includes an outer support structure comprised of a tube or elongate cylinder 12 that extends longitudinally from a first end 14 to a second end 16 and defines a continuous cavity 11 therethrough. In this embodiment, the elongate cylinder 12 defines a cylindrical cavity 11 that is uniform along the length of the cylinder 12, but in other embodiments, other cross-sectional shapes can also be defined by the cavity 11, and the cross-sectional size or shape may be non-uniform along the length of the cylinder 12. For example, the consolidation joiner 10 can define an elliptical or rectangular cavity, which can taper in the longitudinal direction. A slit 18 extends longitudinally between the ends 14, 16 of the cylinder 12. Flanges 20 parallel to the slit 18 are fitted with bolts 22 or other fasteners so that the slit 18 can be opened or closed and the diameter of the cylinder 12 can be adjusted accordingly. Preferably, the cylinder 12 is biased to an open configuration so that the slit 18 is open unless the bolts 22 are tightened to close the slit 18. End plates 28 correspond to the ends 14, 16 of the cylinder 12, and bolt holes 24 at the ends 14, 16 of the cylinder correspond to bolt holes 32 of the end plates 28 so that the end plates 28 can be positioned to close the ends 14, 16 and bolts (not shown) can be inserted and tightened to secure the end plates 28 thereon. The consolidation joiner 12 is supported by base supports 26, though other conventional support structures can also be provided. The cylinder 12 and end plates 28 can be formed of a variety of materials including, but not limited to, steel, aluminum, titanium, composites, and alloys thereof. Additionally, there can be disposed on the working surfaces of the cylinder 12 and end plates 28 a low friction layer or release layer, e.g., Teflon®, registered trademark of E.I. du Pont de Nemours and Company. The release layer can be a durable layer of material or a release agent that is wiped or sprayed onto the working surfaces before each consolidation joining process.

Figure 2:
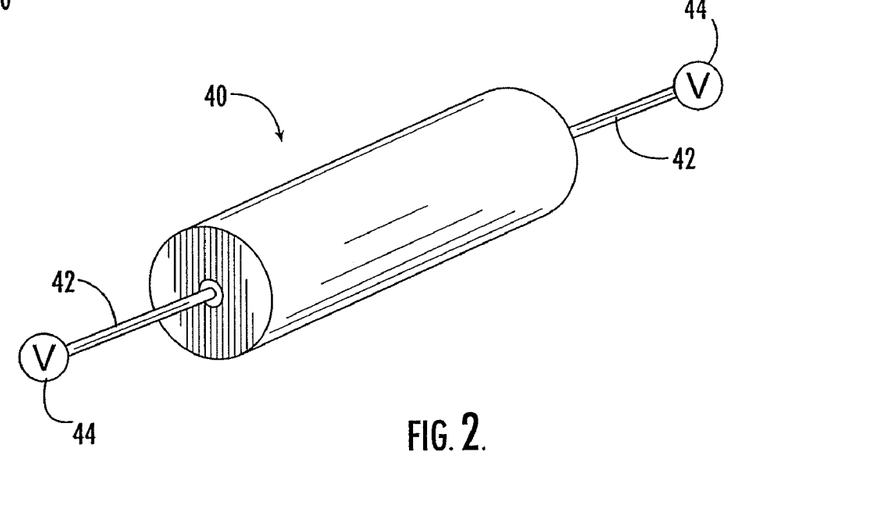
FIG. 2 is a perspective view of a bladder for use with the consolidation joiner apparatus of FIG. 1.

The consolidation joiner 10 also provides an inflatable bladder 40, as shown in FIG. 2, which can be inserted in the cavity 11 of the cylinder 12 prior to installing the end plates 28. The bladder 40 provides at least one valve 44, which can be mounted on a stem 42. According to the embodiment shown in FIG. 2, the bladder 40 includes two stems 42 extending longitudinally therefrom and a valve 44 at the end of each stem 42. The valves 44 are configured to receive fluid, i.e., a gas or liquid, for inflating the bladder 40. Preferably, the bladder 40 is formed of an elastomeric material such as silicone, rubber, or neoprene, which allows the bladder 40 to expand during inflation. A low friction material or film, such as Teflon®, can also be disposed on the bladder 40.

Figure 3:
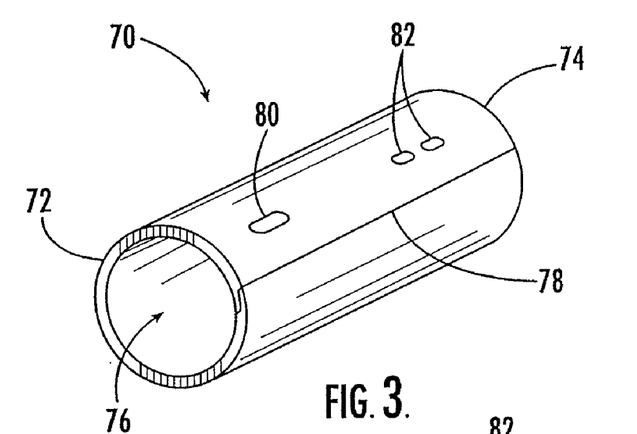
FIG. 3 is a perspective view of a duct formed with a consolidation joiner apparatus according to one embodiment of the present invention.

The consolidation joiner 10 can be used to form a seam or joint in a thermoplastic material. For example, the consolidation joiner 10 can form a cylindrical thermoplastic duct 70 as shown in FIG. 3. The duct 70 extends longitudinally from a first end 72 to a second end 74 and defines a passage 76. A seam or joint 78 extends longitudinally between the ends 72, 74 of the duct 70. The duct 70 can include a variety of connection features such as a spud hole 80 and detail holes 82. The spud hole 80 can be located on the duct 70 to coincide with a desired location for a spud (not shown), or fitting, which can be used to fluidly connect the passage 76 of the duct 70 to another duct or device. The details hole 82 can be configured to receive bolts, screws, rivets, clips, or other fasteners for connecting a detail device such as a bracket (not shown) to the duct 70.

Preferably, the duct 70 is formed of a composite laminate that includes a thermoplastic matrix and a reinforcing material. Thermoplastic materials are characterized by a transition to a plastic state when heated above a glass transition temperature. For example, the duct 70 can be formed of polyetherimide (PEI) or polyphenol sulfide (PPS), both of which can be thermoplastic. Thermoplastic PEI is available under the trade name Ultem®, a registered trademark of General Electric Company. According to one embodiment of the present invention, each duct 70 is formed of a composite material that includes a matrix of thermoplastic PEI that is reinforced with a reinforcing material such as carbon, glass, or an aramid fabric such as Kevlar®, or fibers of such a material. Alternatively, the duct 70 can be formed of other thermoplastic materials, which can be reinforced by other reinforcing materials, or can include no reinforcing materials.

The duct 70 can be used in numerous applications including, but not limited to, environmental control systems of aerospace vehicles, in which air is delivered through the passage 76 of the duct 70 to provide heating, cooling, ventilation, and/or pressurization of an aircraft cabin. The ends 72, 74 of the duct 70 can be connected to other ducts or other devices such as ventilators, compressors, filters, and the like. Multiple ducts 70 can be connected so that a longitudinal axis of each duct 70 is configured at an angle relative to the longitudinal axis of the adjoining duct(s) 70. Thus, the ducts 70 can be connected to form an intricate duct system (not shown) that includes numerous angled or curved ducts for accommodating the devices connected by the duct system and for meeting layout restrictions as required, for example, on an aircraft where space is limited.

Figure 4:
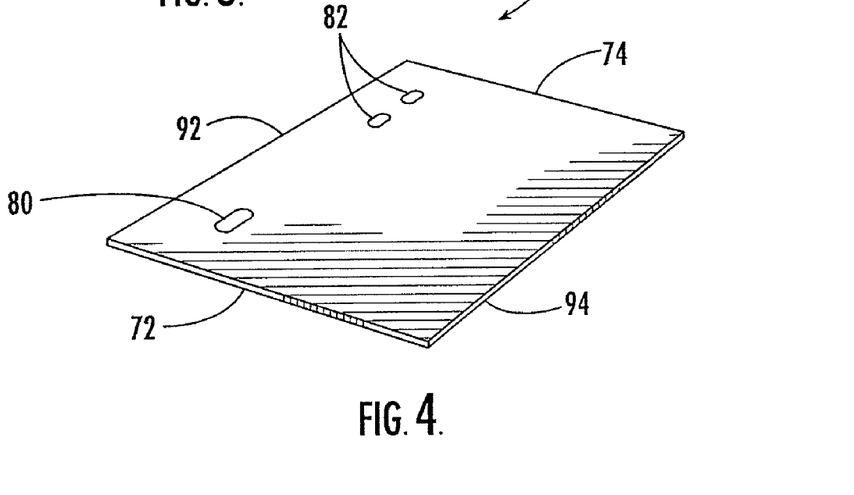
FIG. 4 is a perspective view of a thermoplastic preform for forming the duct of FIG. 3.

There is illustrated in FIG. 4 a preform 90 for forming the duct 70. The preform 90 comprises a flat sheet of thermoplastic laminate and defines the first and second ends 72, 74, first and second longitudinal edges 92, 94, and the connection features 80, 82. Preferably, the preform 90 defines a geometric pattern that corresponds to a desired shape or configuration of the duct 70. The geometric pattern of the preform 90 is determined by projecting the desired shape of the duct 70 onto the flat laminate sheet shown in FIG. 4. Methods and apparatuses for forming preforms and for determining geometric patterns that correspond to ducts are provided in U.S. application Ser. No. 10/215,110, titled "Thermoplastic Laminate Duct," filed concurrently herewith, the entirety of which is incorporated herein by reference.

Figure 5:
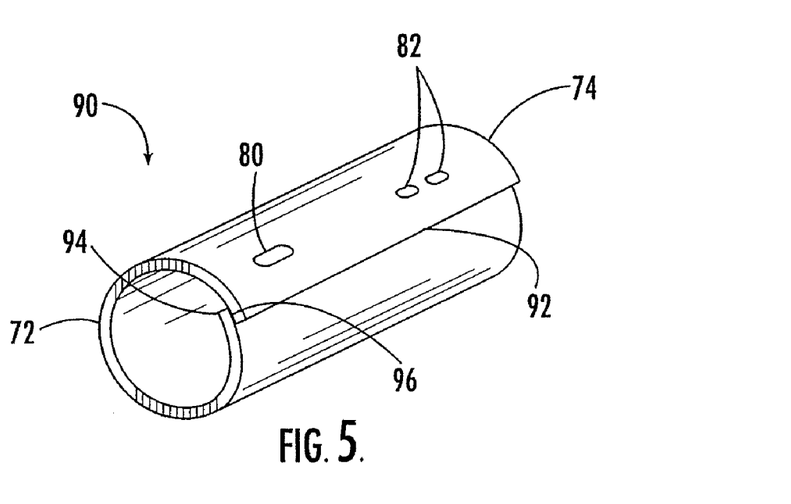
FIG. 5 is a perspective view of a bent, or preformed, preform formed from the preform of FIG. 4.

Preferably, the preform 90 is also bent, or "preformed," to at least generally correspond to the desired spatial configuration of the duct 70. For example, there is shown in FIG. 5 a preformed preform 90 that is bent or rolled so that the first and second longitudinal edges 92, 94 are brought into proximity and the preform 90 defines the passage 76 and generally forms the cylindrical shape of the duct 70 of FIG. 3. The preform 90 illustrated in FIG. 5 is configured in the illustrated preformed shape such that the preform 90 tends to retain that shape, i.e., the preform 90 can be configured from the bent or preformed shape to the precise desired shape of the duct 70 without inducing significant stresses in the preform 90. The preform 90 can be bent in a circular cross section, as illustrated, or in another shape such as a square, rectangle, triangle, ellipse, and the like. One of the first or second longitudinal edges 92, 94 overlays a portion of the other edge 92, 94 to form an interface 96 therebetween. Methods of configuring preforms to a bent, or preformed, configuration are provided in U.S. application Ser. No. 10/215,815, titled "Preforming Thermoplastic Ducts," filed concurrently herewith, the entirety of which is incorporated by reference.

Figure 6:
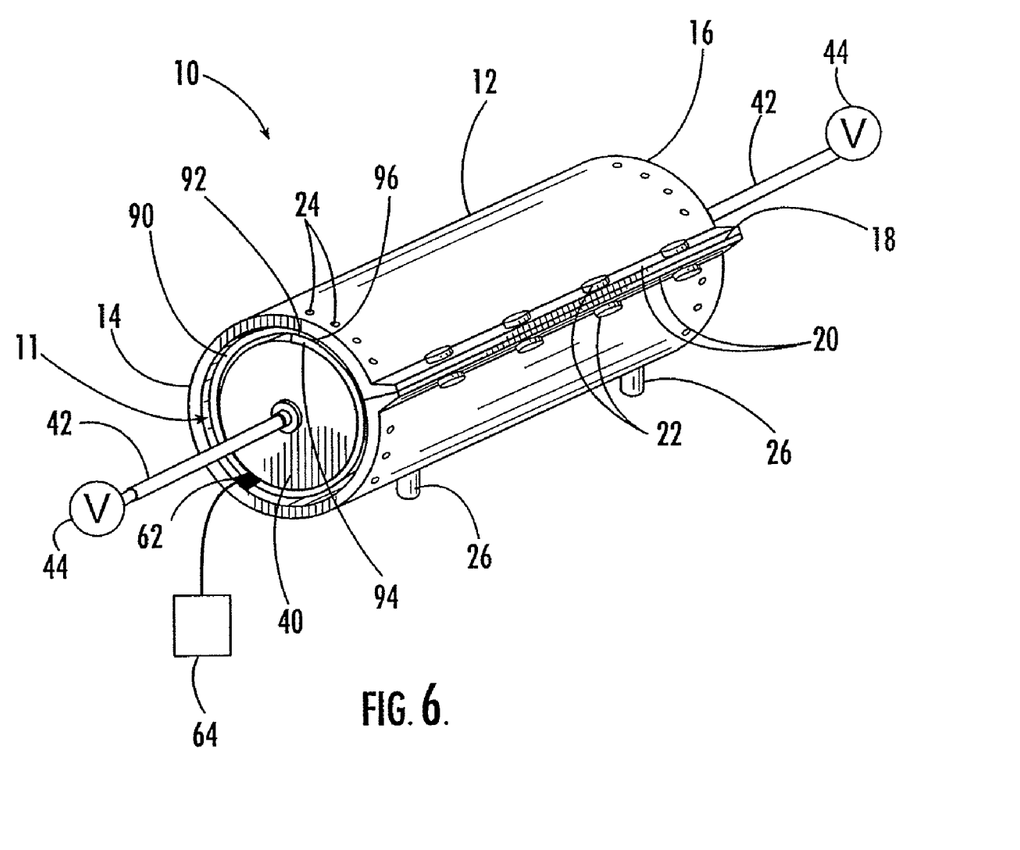
FIG. 6 is a perspective view of the consolidation joiner apparatus of FIG. 1 with the preform and bladder inserted.

The preform 90 can be inserted into the elongate cylinder 12 of the consolidation joiner 10 prior to installing the end plates 28, as shown in FIG. 6. Preferably, the preform 90 defines a cross section that is larger than that of the duct 70, i.e., the preform must be further bent from the preformed shape in order to be configured to the desired shape of the duct 70. In one embodiment, the cylinder 12 is configured to expand to a size larger than the preform 90 by adjusting the bolts 22 to open the slit 18. The slit 18 preferably provides enough adjustment to the cylinder 12 so that closing the slit 18 bends the preform 90 to a cross sectional size that is smaller than the unrestrained size of the preform 90. In one embodiment, in which the preform 90 is less than about 0.020 inches larger than the desired cross sectional size of the duct 70, the slit 18 can be adjusted to provide at least a 0.020 inch change in the diameter of the cavity 11 of the cylinder 12. Thus, when the cylinder 12 is closed, the preform 90 is slightly bent and the spring force of the preform 90 tends to hold the preform 90 in its position in the cylinder 12. Alternatively, if the cylinder 12 does not open larger than the preform 90, or if no slit 18 is provided in the cylinder 12, the preform 90 is bent further to a size smaller than the cylinder 12 by a manual or automated method and inserted into the cylinder 12.

Figure 7:
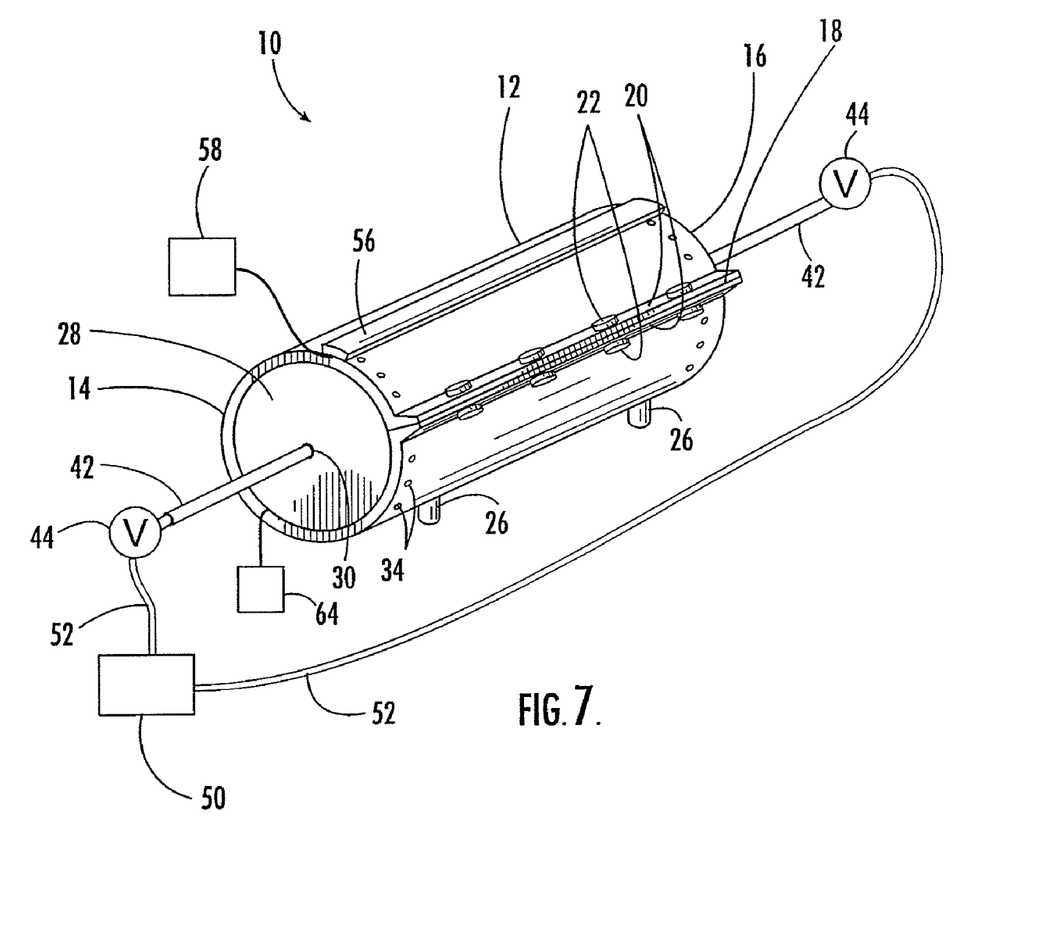
FIG. 7 is a perspective view of the consolidation joiner apparatus of FIG. 6 with the end plates installed and the pressure source and power supply connected.

After the preform 90 is inserted into the cavity 11 of the cylinder 12 and the bolts 22 are tightened to close the slit 18, the consolidation joiner 10 can be assembled. The cylinder 12 is configured to receive the bladder 40 such that the bladder 40 is positioned within the preform 90 as shown in FIG. 6. Preferably, the bladder 40 is about as long as the cylinder 12 so that the cylinder 12 can be filled by the bladder 40. The bladder 40 can be deflated by releasing fluid from at least one of the valves 44 to facilitate the insertion of the bladder 40 into the cylinder 12, and the bladder 40 can then be inserted longitudinally into the cylinder 12 from either end 14, 16 so that the stems 42 extend from the cylinder 12. As shown in FIG. 7, the end plates 28 are positioned at the ends 14, 16 of the cylinder 12 and secured with bolts that extend through holes 24 in the cylinder 12 and into corresponding holes 32 in the end plates 28. The stems 42 extend through the stem apertures 30 defined by the end plates 28, and the valves 44 are configured to be fluidly connected to a pressure source 50 via pressure hoses 52. Although two valves 44 are shown in FIG. 7, both of which are connected to the pressure source 50, the consolidation joiner 10 can include any number of valves 44, some or all of which can be connected to the pressure source 50 for inflation. The pressure source 50 can comprise a compressor, pump, pressurized fluid vessel, or other devices for supplying pressurized fluid to the bladder 40. In one advantageous embodiment, the pressure source 50 provides air to the bladder 40, but the pressure source 50 can also provide other gases, such as nitrogen, or liquids such as water or oil.

Figure 8:
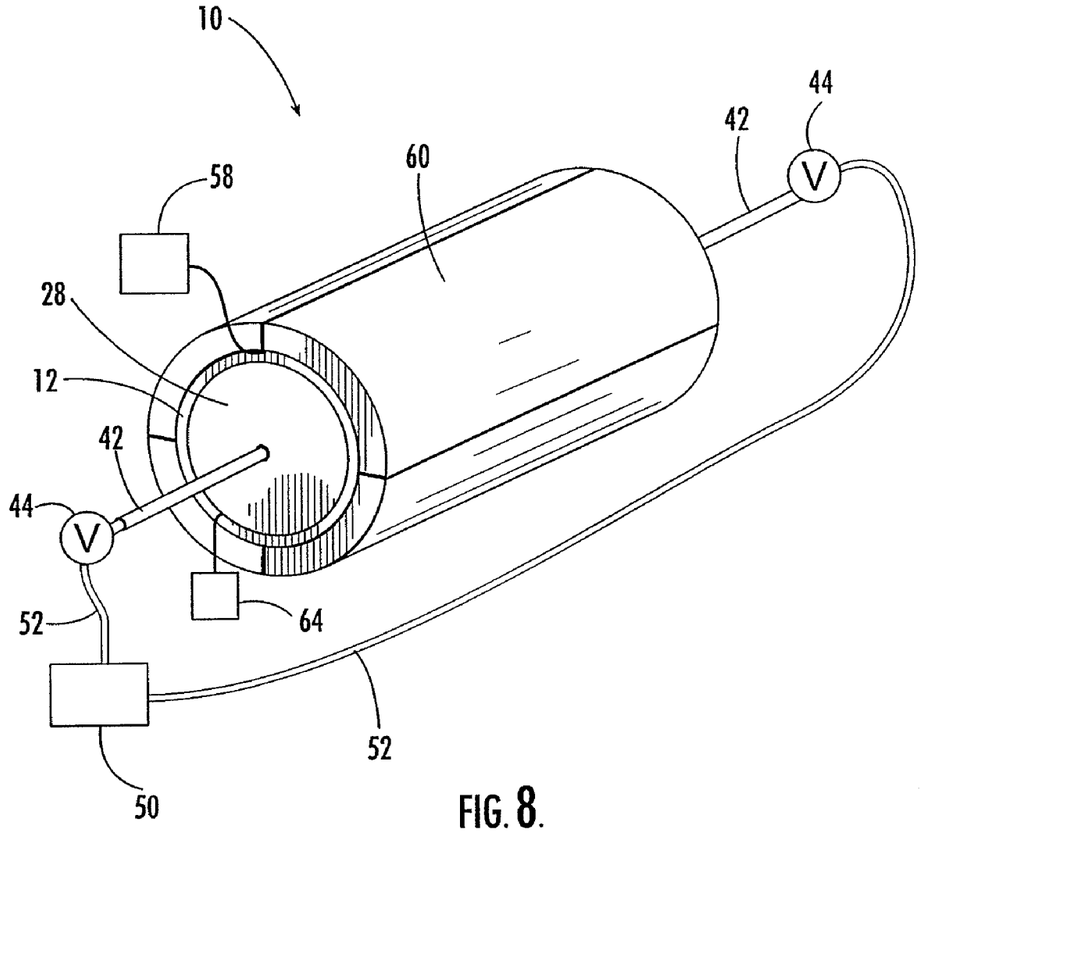
FIG. 8 is a perspective view of the consolidation joiner apparatus of FIG. 7 with the insulation installed.

The consolidation joiner 10 also includes at least one heater 56, which can be permanently attached to the cylinder 12 or removable from the cylinder 12 and/or adjustable on the cylinder 12, for example, by taping or bolting the heater 56 to the cylinder 12. The heater 56 is a bar or strip heater, but other types of heaters can be used such as heating blankets and other electrical resistance heaters, gas heaters, and other heaters as are known in the art. The heater 56 is advantageously configured proximate to the interface 96 of the preform 90 so that the heater 56 can be used to heat at least the interface 96 of the preform 90 in order to join the edges 92, 94 of the preform 90 and form the longitudinal seam 78 therealong. The heater 56 is connected to a power supply 58, which provides electrical energy to the heater 56 for heating. In FIGS. 6-8, the preform 90 is configured in the cylinder 12 so that the longitudinal edges 92, 94, and hence the interface 96, is positioned at the top of the cylinder 12, but the preform 90 can alternatively be configured so that the interface 96 is positioned at any other angular position. Preferably, the heater 56 is configured outside the cylinder 12 to directly oppose the position of the interface 96, e.g., at the top of the cylinder 12 in FIG. 7. Insulation 60 can also be provided around part of all of the cylinder 12 and heater 56 to increase the thermal energy retained by the consolidation joiner 10 during processing. The insulation 60 can comprise one or more panels or blankets, which can be taped or bolted in place as shown in FIG. 8.

Figure 9:
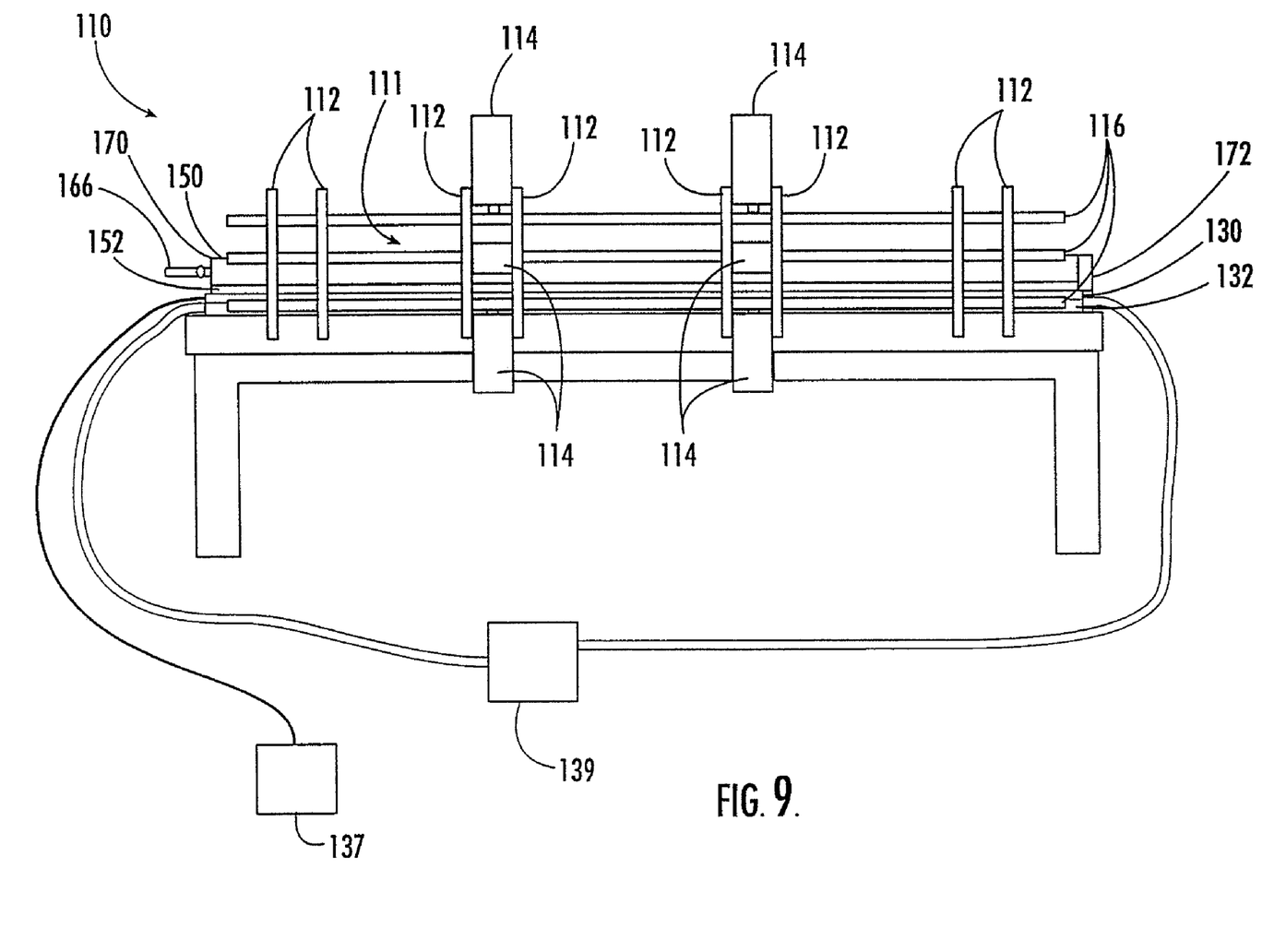
FIG. 9 is an elevation view of a consolidation joiner apparatus according to another embodiment of the present invention.
Figure 10:
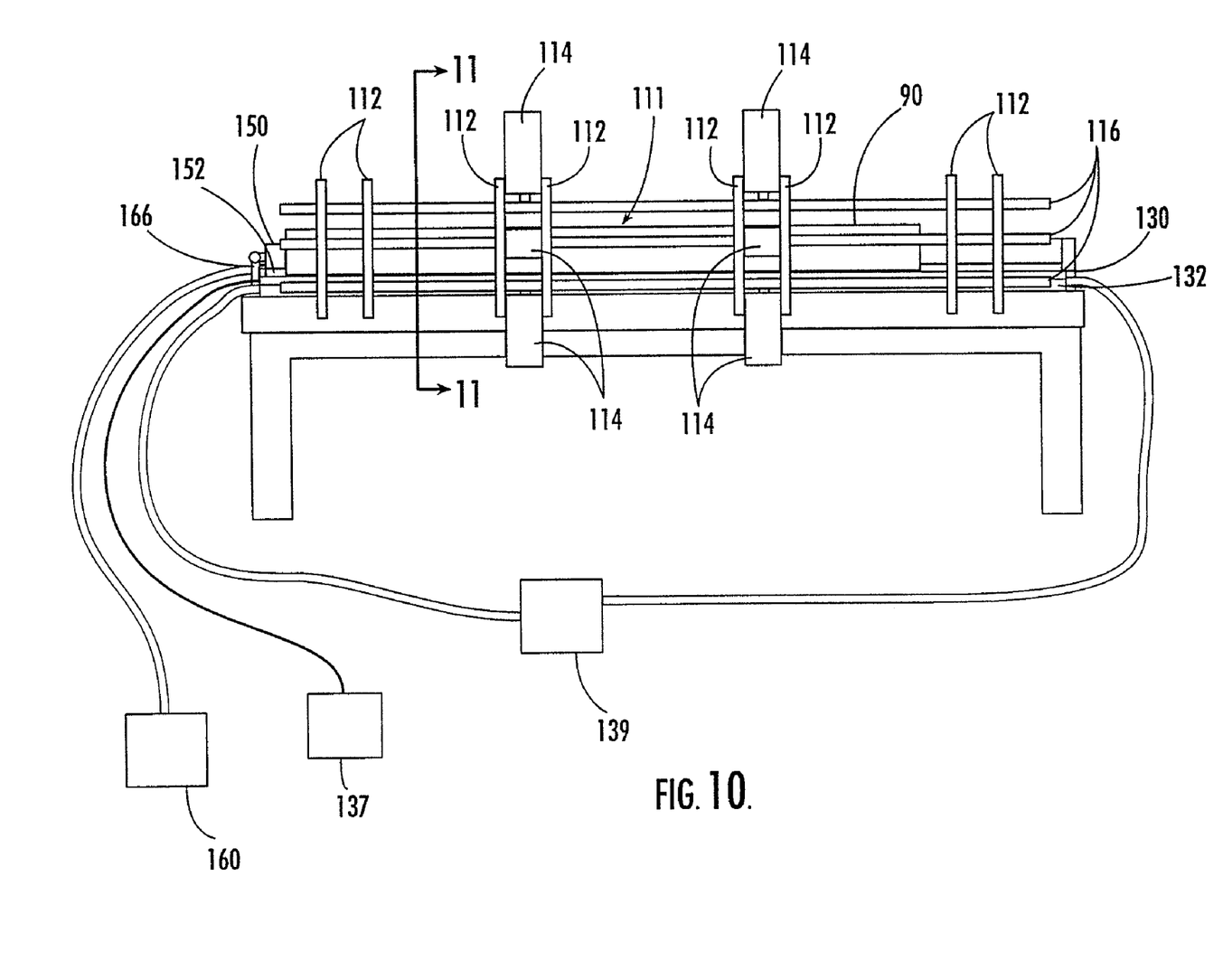
FIG. 10 is an elevation view of the consolidation joiner apparatus of FIG. 9 with the preform installed.
Figure 11:
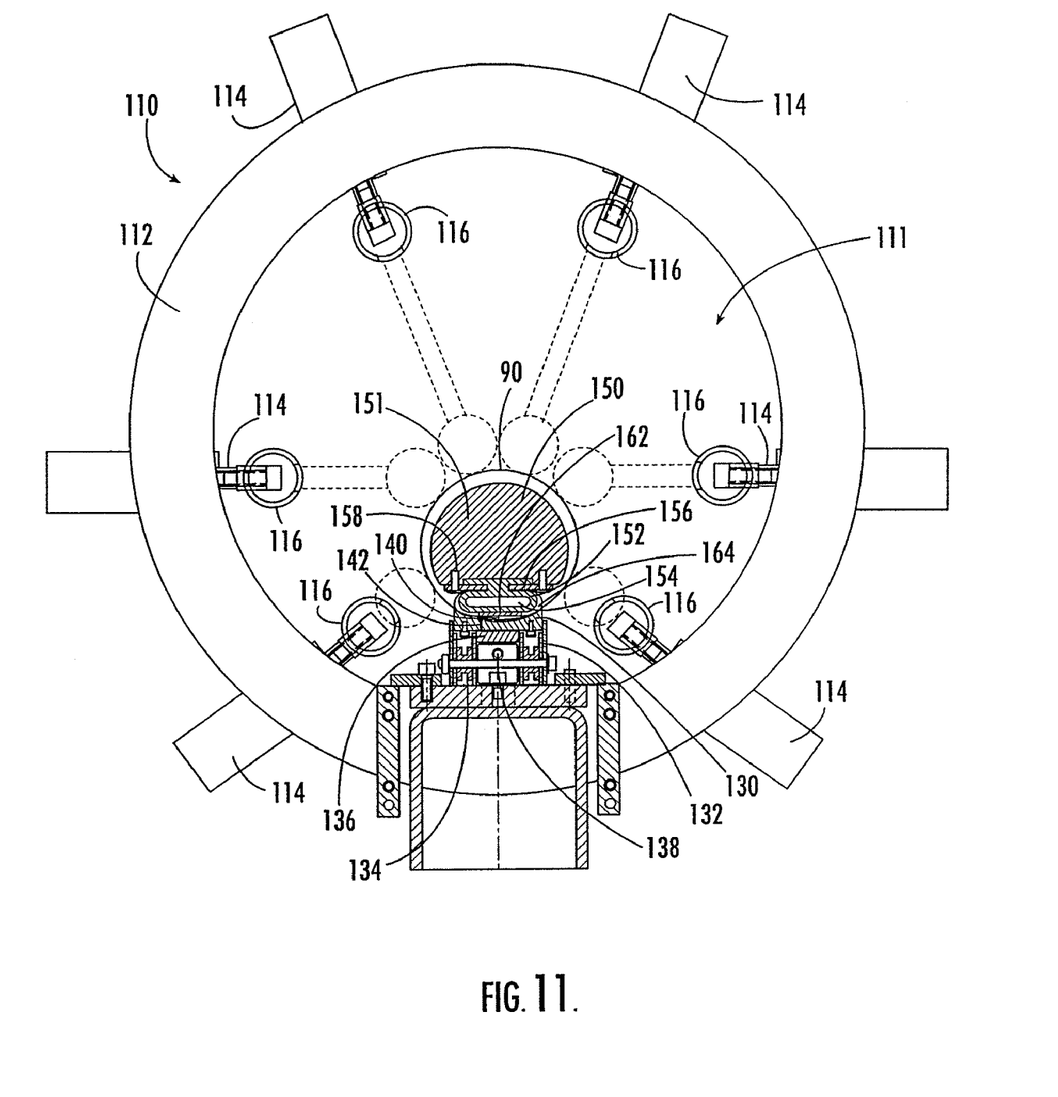
FIG. 11 is a section view of the consolidation joiner apparatus of FIG. 10 as seen along line 11-11 of FIG. 10.

In FIGS. 1-8, the consolidation joiner 10 includes an outer support structure comprising the elongate cylinder 12, each of which has a fixed diameter defined by the closed position and are typically used for consolidation joining preforms 90 of a particular size that corresponds to the cavity 11 of the cylinder 12. However, in other embodiments, the present invention provides an adjustable outer structure that can be used to support preforms 90 of different diameters. For example, there is shown in FIGS. 9-11 a consolidation joiner 110 that includes an outer support structure comprising ring supports 112, each arranged about a common longitudinal axis. The ring supports 112 support actuators 114, which are configured to support a plurality of parallel rods 116, six in the illustrated embodiment, and adjust the rods 116 radially inward and outward. As shown in FIG. 11, the rods 116 can be adjusted radially to define an adjustable cavity 111 therein and, thus, support preforms 90 of different diameters and/or shapes.

The outer support structure of the consolidation joiner 110 also includes an anvil 130, which is supported by an anvil support structure 132. Preferably, the anvil 130 is shaped according to the desired shape of the duct 70. For example, the anvil 130 may have an arcuate shape of a predefined radius. The anvil 130 can be removable from the support structure 132 so that anvils 130 of different sizes and shapes can be installed according to the duct 70 that is being processed. Further, the anvil support structure 132 can be adjustable to accommodate different anvils 130. For example, the anvil support structure 132 can include mounting spacers 134 that can be replaced with mounting spacers 134 of different sizes according to the width of the anvil 130 that is supported by the support structure 132. The support structure 132 also supports a heater 136, which can be a bar heater as illustrated in FIG. 11, or various other types of heaters as are known in the art. Preferably, the heater 136 is located proximate to the anvil 130 so that heat from the heater 136 can be conducted by the anvil 130 to the preform 90 during processing. A fluid manifold 138 is also supported by the support structure 132 and located near the anvil 130. The fluid manifold 138 is configured to receive a fluid, for example, from a fluid source to cool the preform 90. At least one edge stop 140 is configured to extend from the support structure 132 toward the preform 90. For example, as illustrated in FIG. 11, each edge stop 140 is biased by a spring 142 to extend through the anvil 130. The edge stops 140 can be located at various positions along the length of the support structure 132 and can be integral to the anvil 130.

An inner beam 150, which extends from a first end 170 to a second end 172, is positioned in the cavity 111 defined by the rods 116 such that the preform 90 can be positioned around the inner beam 150. Although the ends 170, 172 of the inner beam 150 are connected to the anvil support structure 132, at least one of the ends 170, 172 of the inner beam 150 can be disconnected from the anvil support structure 132 to facilitate the insertion of the preform 90 into the cavity 111 of the consolidation joiner 110. For example, a latch 166 can be adjusted between an open position and a closed position. With the latch 166 in the open position, shown in FIG. 9, the preform 90 can be inserted longitudinally into the consolidation joiner 110 such that the preform 90 is disposed around the inner beam 150 with the interface 96 positioned between the inner beam 150 and the anvil 130. The edge stops 140 can be used to position the interface 96 between the inner beam 150 and the anvil 130. For example, the preform 90 can be inserted into the cavity to enclose the inner beam 150 and then rotated until one of the longitudinal edges 92, 94 of the preform 90 contacts the edge stops 140, preventing further rotation. If the preform 90 is positioned so that the first edge 92 is positioned outside the preform 90 as shown in FIG. 11, the preform is rotated in a clockwise direction until the first edge 92 is rotated over the anvil 130 and contacts the edge stops 140. When the preform 90 is properly positioned in the cavity 111, the latch 166 can be moved to the closed position, shown in FIG. 10, securing the inner beam 150 in position relative to the anvil 130.

As shown in FIG. 11, the inner beam 150 includes a rigid member 151 and an inflatable seal 152, or bladder, that is connected to the rigid member by a seal retainer 156 and/or screws (not shown) and located opposite the anvil 130. Preferably, the inflatable seal 152 is formed of an elastomeric material and defines a fluid passage 154 such that the inflatable seal 152 can receive a fluid in the fluid passage 154 and be inflated to urge the preform 90 against the anvil 130. For example, the inflatable seal 152 can be formed of silicone, rubber, neoprene, or other flexible materials. A flexible silicon heater 162 is provided on the inflatable seal 152 such that the heater 162 is urged toward the preform 90 when the inflatable seal 152 is inflated. Thus, the heater 162 can be used to radiate heat radially outward to heat the interface 96 of the preform 90 during consolidation joining. A low-friction film 164 disposed on the inflatable seal 152 reduces the tendency of the preform 90 to stick to the inflatable seal 152 and/or the heater 162. For example, the low-friction film 164 can be formed of Teflon®. Each of the flexible silicon heater 162 and the bar heater 136 can comprise other types of heaters as are known in the art. Additionally, in other embodiments, the consolidation heater 110 can include only one of the heaters 136, 162.

During operation, the consolidation joiners 10, 110 are used to consolidation join the edges 92, 94 of the preform 90 to form the joint 78 in the duct 70 by providing pressure and heat to the interface 96 of the preform 90. Pressure is provided to the interface 96 by supporting the preform 90 in the cavity 11, 111 defined by one of the outer support structures, for example, the cylinder 12 of FIG. 1 or the rods 116 and the anvil 130 of FIG. 11, and filling one of the bladder 40 or inflatable seal 152 to urge the preform 90 radially outward, for example, with a pressure of about 20 psi. Heat is provided by one or more of the heaters 56, 136, 162, which are preferably configured to heat the interface of the preform 90 to above a glass transition temperature at which the thermoplastic material of the preform 90 becomes plastically formable, for example, about 417° F. for a composite formed of polyetherimide. In other embodiments the consolidation pressure and temperature can be higher, for example, 60 psi and 650° F. or higher.

More particularly, the consolidation joiner 10 of FIG. 1 can be used to consolidation join the preform 90, as shown in FIG.

4 or 5, to form the duct 70 of FIG. 3. The cylinder 12 of the consolidation joiner 10 is opened by loosening the bolts 22 and separating the flanges 20 to open the slit 18. The preform 90 is positioned in the cavity 11 of the cylinder 12, as shown in FIG. 6, and thermocouples 62 can be placed in or proximate to the interface 96 of the preform 90 to accurately monitor the temperature of the interface 96 during processing using a monitor 64 that is electrically connected to the thermocouple (s) 62. The temperature of the interface 96 can also be estimated without directly measuring the preform 90. For example, if the cylinder 12 is longer than the preform 90 that is being processed, one or more pieces of scrap material (not shown) made of substantially the same material as the preform 90 and substantially the same thickness as the preform 90 can be put in the cylinder 12 in a space not occupied by the preform 90, and the thermocouples 62 can be placed in, on, or under the scrap material. Two or more pieces of scrap material can be overlapped in the cylinder 12 so that the thermal variation between the scrap materials accurately replicates the thermal variation in the interface 96. The bladder 40 is deflated and inserted longitudinally into the cylinder 12 within the preform 90, so that the stems 42 extend from the cylinder 12. The bolts 22 are tightened to close the slit 18 and, hence, the cylinder 12. The endplates 28 are positioned at the ends 14, 16 of the cylinder 12 so that the stems extend therethrough, and the bolts are installed to secure the end plates 28 to the cylinder 12, as shown in FIG. 7. The pressure source 50 is connected to one or both of the valves 44. The heater 56 is connected to the cylinder 12, for example, by bolting or taping, and the heater is connected to the power supply 58. Preferably, the heater 56 is installed to oppose the interface 96 of the preform 90 so that heat can be conducted from the heater 56, through the cylinder 12, and to the interface 96. The insulation 60 is configured around the cylinder 12, and fasteners such as bolts, clips, tape, or the like are used to secure the insulation 60 in place.

With the consolidation joiner 10 assembled as shown in FIG. 8, the bladder 40 is inflated, for example to a pressure of about 20 psi or higher, so that the bladder 40 exerts a force radially outward on the preform 90, urging the preform to conform to the shape of the cylinder 12 and urging the edges 92, 94 of the preform together at the interface 96. The power supply 58 is energized to provide electrical energy to the heater 56, which generates heat. The heat is conducted from the heater 56 to the preform 90 and heats the interface 96, preferably to above the glass transition temperature of the preform 90. In one embodiment, in which the preform 90 comprises PEI, the heater 56 heats the interface 96 to a temperature of between about 417° F. and 480° F. For example, the interface can be heated to about 460° F. The monitor 64 is used to monitor the temperature of the preform 90 (or scrap) so that the desired temperature can be achieved at the interface 96, and the desired temperature is maintained for a predetermined consolidation interval, for example, about 15 minutes. The force exerted by the bladder 40 urges the longitudinal edges 92, 94 together and consolidates the interface 96 to form the duct 70 with the joint 78, which is preferably substantially smooth on both the interior and exterior of the duct 70. After the consolidation interval has passed, the heater 56 is turned off and the duct 70 begins to cool. Preferably, the duct 70 is cooled to a temperature below the glass transition temperature before the bladder 40 is deflated, the consolidation joiner 10 is disassembled, and the duct 70 is removed therefrom.

According to another embodiment, the consolidation joiner 110 of FIG. 9 can also be used to form the duct 70 of FIG. 3 from one of the preforms 90, as shown in FIG. 4 or 5. The axial actuators 114 are retracted to retract the rods 116 radially outward, the latch 166 is opened, and the inflatable seal 152 is deflated. The preform 90 is longitudinally installed in the consolidation joiner 110 around the inner beam 150 so that the interface 96 is positioned between the inflatable seal 152 and the anvil 130. As described above, thermocouples (not shown) can be placed in or proximate to the interface 96 of the preform 90 to monitor the temperature of the interface 96 during processing using a monitor (not shown), or the thermocouples can be used to measure a piece of scrap (not shown). The latch 166 is closed to secure the first end 170 of the inner beam 150 to the anvil 130. The pressure source 160 is connected to the inflatable seal, the power supply is electrically connected to the heaters 136, 162, and the fluid source 139 is connected to the fluid manifold 138.

With the consolidation joiner 110 assembled as shown in FIG. 10, the actuators 114 are actuated to extend the rods 116 radially inward so that the rods 116 contact the preform 90 and support the preform 90 as shown in FIG. 11. The inflatable seal 152 is inflated with fluid from the pressure source 160 so that inflatable seal 152 exerts a force radially outward on the preform, urging the longitudinal edges 92, 94 of the preform 90 together at the interface 96. The power supply 137 is energized to provide electrical energy to the heaters 136, 162, which generate heat that is conducted from the heaters 136, 162 to the preform 90 at the interface 96. Preferably, the heaters 136, 162 heat the interface 96 to above the glass transition temperature of the preform 90, as described above. The force exerted by the inflatable seal 152 urges the longitudinal edges 92, 94 of the preform 90 together and consolidates the interface 96 to form the duct 70 with the joint 78. After the consolidation interval has elapsed, the heaters 136, 162 are turned off and the duct 70 cools. Preferably, the duct 70 is cooled to a temperature below the glass transition temperature before the inflatable seal 152 is deflated, the latch 166 is opened, and the duct 70 is removed from the consolidation joiner 110.

The consolidation joiners 10, 110 include an elastomeric device such as the bladder 40 and the inflatable seal 152, which are adjustable radially outward to urge the interface 96 of the preform against the outer support structure of the cylinder 12 or anvil 130, respectively. In each instance, the elastomeric member 40, 152 urges the preform 90 against the opposite support structure while the interface 96 is heated to form a consolidation joint 78 therein.

After the duct 70 has been formed, the duct 70 can be post-formed to provide additional contours or features, such as bells, beads, and the like. A discussion regarding the formation of duct features such as bells and beads through post-forming, i.e., after the consolidation joining of the joint, is provided in U.S. application Ser. No. 10/215,780, titled "Post-Forming of Thermoplastic Ducts," filed concurrently herewith, the entirety of which is incorporated by reference. It is appreciated that less than the entire interface 96 of the preform 90 can be consolidation joined according to the present invention, so that at least a portion of the interface 96 remains unjoined. Joining of a particular portion of the interface 96 can be prevented by not providing heat or pressure to that portion or by providing a separation material, such as heat resistant tape, between the edges 92, 94 during the consolidation joining process. The resulting unjoined portion can be consolidation joined, for example, as a part of a post-forming process, as discussed in U.S. application Ser. No. 10/215,780, titled "Post-Forming of Thermoplastic Ducts." It is also appreciated that marks can be provided on the preform 90, for example, to accurately identify the location of such post-formed features or to facilitate the manufacture or assembly of the ducts, as provided in U.S. application Ser. No. 10/216,110, titled "Thermoplastic Laminate Duct."

Many modifications and other embodiments of the invention will come to mind to one skilled in the art to which this invention pertains having the benefit of the teachings presented in the foregoing descriptions and the associated drawings. As pointed out above, for example, the consolidation joiner may be configured to form ducts having non-cylindrical shapes, such as rectangular, elliptical, or other shapes. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of forming a thermoplastic laminate duct, the method comprising:
    radially actuating a support structure to bend a thermoplastic laminate preform about a longitudinal axis and thereby configure the preform generally to a desired shape of the duct extending longitudinally and defining a passage, such that a first longitudinal edge of the preform at least partially overlaps a second longitudinal edge of the preform to define an interface between first and second surfaces of the preform, wherein said actuating step comprises adjusting a plurality of longitudinally extending rods radially inward to bend the preform about a longitudinal member;
    urging the first and second surfaces of the interface together; and
    heating the interface concurrently with said urging step such that the interface is consolidated to form a joint.

2. A method according to claim 1, further comprising forming the thermoplastic laminate preform by impregnating a reinforcement material with a thermoplastic.

3. A method according to claim 2, wherein said forming step comprises impregnating the reinforcing material comprising at least one of the group consisting of an aramid, carbon, and glass with the thermoplastic comprising at least one of the group consisting of polyetherimide and polyphenol sulfide.

4. A method according to claim 1, wherein said actuating step comprises actuating the support structure radially inward.

5. A method according to claim 1, wherein said urging step comprises filling a bladder with fluid such that the bladder fills a cavity of the perform and urges the preform radially outward against an outer support structure.

6. A method according to claim 1, wherein said urging step comprises inflating a bladder with fluid, the bladder positioned between a beam extending longitudinally through the passage of the preform and the preform, such that the bladder urges the preform radially outward and against an outer support structure.

7. A method according to claim 1, wherein said urging step comprises inflating a bladder with fluid to urge the preform against an anvil positioned in opposing relationship to the bladder, the anvil corresponding to the desired shape of a portion of the duct.

8. A method according to claim 1, wherein said heating step comprises electrically energizing at least one resistive heater to generate heat and conducting heat from the at least one heater to the preform.

9. A method according to claim 1, wherein said heating step comprises energizing a first heater positioned in the passage of the preform and a second heater positioned outside the preform.

10. A method forming a thermoplastic laminate duct according to claim 1, wherein said heating step comprises heating the interface to above a glass transition temperature of the preform.

11. A method forming a thermoplastic laminate duct according to claim 1, further comprising, subsequent to said heating step, cooling the joint to a temperature below the glass transition temperature of the preform while urging the first and second surfaces of the interface together.

12. A method forming a thermoplastic laminate duct according to claim 11, wherein said cooling step comprises circulating fluid through a manifold in thermal communication with the interface of the preform.

13. A method of forming a duct having a longitudinal consolidation joint according to claim 1, further comprising:
    providing the support structure comprising a first support structure extending longitudinally and at least partially defining a cavity, and a second support structure extending longitudinally in the cavity and comprising a rigid elongate member having an outer surface corresponding to the desired configuration of the duct; and
    supporting the preform between the first and second support structures in a preformed configuration that corresponds to a desired configuration of the duct,
    wherein said actuating step comprises adjusting the first support structure radially from a first position toward the second support structure to a second position and thereby urging the preform against the second support structure while the preform is supported in the preformed configuration corresponding to the desired configuration of the duct and thereby configuring the preform to the desired configuration of the duct, at least one of the first support structure, the second support structure, and a heater assembly being elastomeric so as to conform to the interface of the preform.

14. A method according to claim 13 wherein said heating step comprises heating the interface of the preform to above a glass transition temperature while the preform is supported between the first and second support structures to thereby consolidation join the longitudinal edges of the preform.

15. A method according to claim 13, further comprising providing the heater assembly including an elastomeric support and a heater carried by the elastomeric support, wherein said adjusting step comprises urging the heater assembly against the interface of the preform, to heat the interface to a temperature above the glass transition temperature of the preform.

16. A method according to claim 13 wherein said heating step comprises heating with the heater assembly positioned outside the cavity and in thermal communication with an outer surface of the preform and with a second heater, the second heater being flexible and disposed on the bladder such that the second heater is urged against an inner surface of the preform during said adjusting step.

17. A method for manufacturing an aircraft, the method comprising:
    forming a thermoplastic lain mate duct according to the method of claim 1; and
    providing the thermoplastic laminate duct in a duet system of an aircraft.

* * * * *